3,294,706
CATALYST REJUVENATION PROCESS
George Constabaris, Berkeley, and Hugh F. Harnsberger, San Anselmo, Calif., assignors to Chevron Research Company, a corporation of Delaware
No Drawing. Filed Dec. 5, 1963, Ser. No. 328,170
7 Claims. (Cl. 252—412)

The present invention relates to the activation of hydrogenative conversion catalysts and pertains more especially to the reactivation of catalysts which have become deactivated after long exposure to hydrogenative conversion conditions. The invention more particularly concerns the restoration or rejuvenation of hydrocracking catalysts which, after long exposure to hydrocarbon feeds under hydrocracking conditions have become deactivated and so changed that conventional removal of the accumulated carbonaceous deposits does not produce a catalyst with the desired percentage of the original hydrocracking activity. The invention also relates to a hydrocracking process for converting petroleum distillates and residua to various valuable products for sustained periods of on-stream operation and wherein the hydrocracking operation is discontinued and the catalyst rejuvenated to increase substantially the useful life of the catalyst.

In the so-called non-regenerative catalytic processes, the catalyst remains active for long periods of time and does not need to be periodically regenerated every few minutes or hours. However, the catalysts used in such non-regenerative processes gradually become deactivated after many days on-stream and need to be replaced or preferably reactivated in situ. For example, as shown in Scott Patent No. 2,944,006, hydrocarbon feeds can be hydrocracked to valuable products for long on-stream periods at reasonable operating conditions without intolerable catalyst fouling rates with a sulfide of nickel or cobalt disposed on an active siliceous cracking catalyst support, provided the hydrocarbon feed has a low nitrogen content. However, it has been found that such catalysts after long exposure to hydrocarbon feed under hydrocracking conditions become deactivated with the nickel or cobalt component so changed that conventional removal of the accumulated carbonaceous deposits does not result in the catalyst regaining an adequate percentage (i.e., over 35%, preferably over 50%) of its original hydrocracking activity. During the long exposure to hydrocracking and other hydrogenative conversion conditions, such catalysts undergo a change which appears to be related at least in part to a crystalline growth phenomenon of the hydrogenating metal component of the catalyst. This crystalline growth phenomenon either brings about or is related to the inability of the hydrocracking catalyst to be regenerated by conventional regeneration procedures to the desired high proportion of its fresh catalyst activity. Regeneration by mere combustion of the carbonaceous deposits accumulated on the deactivated catalyst does not produce a catalyst with the desired percentage of the original hydrocracking activity apparently because the hydrogenating metal component is not redistributed but rather remains in a form which is substantially inactive for hydrocracking.

As described in copending application Serial No. 303,667 filed August 21, 1963, it has been found that hydrocracking activity can be substantially restored by impregnating the deactivated catalyst before removal of the carbonaceous deposits with an aqueous solution of a metal salt and thereafter drying the treated catalyst, converting said salts to active hydrogenating metal components and removing the carbonaceous deposits. This procedure has been found to be particularly applicable to hydrocracking catalysts which have been thermactivated according to the process of the copending application Serial No. 794,109 filed February 18, 1955. In such thermactivation procedure, a relatively dry non-reducing gas such as air, nitrogen or carbon dioxide is passed through the mass of particulate catalyst with the cobalt or nickel present therein in the form of oxides or of compounds decomposable thereto on heating, at a rate which is preferably at least 10 cubic feet per hour per cubic foot of catalyst at temperatures ranging from about 1200 to 1600° F. for times ranging from about 0.25 to 48 hours sufficient to give a substantial increase in activity, with the lower temperatures being used with the longer times and vice versa. However, it has been found that the hydrocracking activity of such a thermactivated catalyst is substantially reduced and the hydrocracking activity of other active freshly prepared hydrocracking catalysts is reduced to a lesser extent, if the catalysts are contacted with an appreciable amount of an aqueous liquid treating agent or are otherwise exposed to substantial amounts of moisture.

The impregnating procedure described above converts the deactivated catalysts into a rejuvenated catalyst having a high hydrocracking activity and a low fouling rate often with lower fouling rate characteristics than freshly prepared catalysts. Furthermore, the procedure can be conducted in situ without having to remove the large amounts of catalyst normally contained in fixed bed reactors and can be carried out without a materials corrosion problem.

However, it has been found that while the catalyst rejuvenated in the aforesaid manner has many desirable characteristics such as high activity and low fouling rates, the resulting catalysts have a pronounced tendency to promote hydrogenative saturation of aromatic rings as evinced by increased hydrogen consumption and higher aniline point products than obtained with freshly prepared catalysts. This hydrogenative saturation tendency is undesirable particularly when treating feeds containing aromatic hydrocarbons since the octane number value of the aromatics is reduced by the hydrogenation. The increased aromatic saturation activity is believed to be due to the large crystals of the hydrogenating metal component which remain on the catalyst and which are relatively active for saturation but inactive for hydrocracking. This theory is given by way of explanation but should not be construed as limiting the scope of the invention as set forth in the claims.

Therefore, an objective of the present invention is to improve the aforesaid impregnation technique of catalyst rejuvenation by eliminating or substantially reducing the undesirable hydrogenative saturation tendency. This objective is attained by the improved process of the present invention while retaining the benefits of rejuvenation to catalysts with high hydrocracking activity and low fouling rates.

The above and other objectives can be attained by subjecting the deactivated catalyst to a carbon monoxide atmosphere under conditions which form normally gaseous carbonyl compounds with the hydrogenative metal component and separating said carbonyl compounds from the treated catalyst support, and then impregnating the treated catalyst with hydrogenating metal salt and thereafter removing the carbonaceous deposits.

It is a particular feature of the present invention that the carbon monoxide treatment removes hydrogenating metal component, particularly the large crystals or particles which are believed responsible for the hydrogenative saturation activity. Thus an important aspect of the invention is in finding that the particular form of hydrogenating metal component is responsible for the undesirable hydrogenative aromatic saturation activity and removing the source of this undesirable hydrogenation activity.

It is important in hydrocracking and an important aspect of the present invention to minimize hydrogen consumption due to aromatic saturation. For example, with relatively low boiling feeds composed of 50% aromatics, saturation of half of the aromatics would consume about 250 s.c.f. of hydrogen per barrel of feed in addition to the hydrogen consumed in the hydrocracking reaction. If such hydrogen consumption can be reduced by half, about 100–125 s.c.f./b. of $H_2$ can be saved, which would amount to a considerable savings in a hydrocracking plant feeding, for example, 10,000 b./d.

Another advantage of the process is that it can be conducted in situ in the reactor without a materials corrosion problem such as would be encountered in treating the catalyst with strong acid. Further the process can be applied repeatedly without building up undesirable amounts of metal components on the catalyst.

Other advantages for the process and preferred aspects thereof will be apparent from the following description taken together with the examples.

In one preferred embodiment of the present invention, the process is used to rejuvenate, and to produce a hydrocracking catalyst of improved low fouling rate from, a supported hydrogenating catalyst which before long exposure to hydrocarbon feed under hydrogenative conversion conditions is an active catalyst composed of at least one hydrogenating metal component selected from Groups VI and VIII metals and components thereof disposed on a high surface area support but which catalyst after long exposure to hydrocarbon feed under hydrogenative conversion conditions has accumulated carbonaceous deposits and has become deactivated with the hydrogenative metal component so changed that conventional removal of the accumulated carbonaceous deposit does not result in reactivation of a substantial percentage of the original hydrogenative conversion activity. Preferably the catalysts are those in which the hydrogenating metal component is selected from Group VIII metals and compounds thereof exclusive of noble metals and compounds thereof. The method is especially applicable to catalyst wherein the hydrogenating metal component is from the iron transitional group, and most preferably nickel and cobalt which for use in hydrocracking are most desirably initially in the form of sulfides.

Normally hydrocracking catalysts are used in fixed beds, the catalyst being composed of pellets, grannules or particles of at least 1/16 inch (usually at least 1/8 inch) in average diameter, and it is to fixed beds of such size catalyst that the present invention is especially directed.

In the process of the present invention, the deactivated catalyst before removal of the carbonaceous deposits is subjected to an atmosphere of carbon monoxide under conditions to convert the hydrogenating metal component to the volatile metal carbonyl. Substantially complete removal of the hydrogenating metal component is most desirable in order to get the maximum reduction in hydrogen consumption due to aromatics saturation. The volatile metal carbonyl is removed from contact with the remaining catalyst composed mainly of supporting material, preferably in a fixed bed in the hydrocracking reactor. Such removal can be accomplished by sweeping out the carbonyl with a stream of carbon monoxide or a secondary displacing gas. For substantially complete removal of hydrogenating metal component, it is sometimes preferable to treat the deactivated catalyst first with a stream of hydrogen at conditions favoring reduction of the hydrogenating metal component to the metal state. If desired, the hydrogen reduction may be repeated after a carbon monoxide treatment, followed by a finishing treatment with carbon monoxide to remove the last traces of hydrogenating metal component.

The treatment with carbon monoxide can be carried out at a temperature sufficient to give an adequate reaction in convenient times. The temperature should be below that at which metal carbides are formed and generally temperatures of 300–400° F. should not be exceeded. Preferably the temperature is in the range of 180–220° F. when nickel is the hydrogenating metal component. Carbon monoxide reacts rapidly with hydrogenating metal components such as nickel in deactivated hydrocracking catalysts. For example, carbon monoxide was added to a deactivated nickel-containing hydrocracking catalyst at 221° F. in an amount which, without reaction, would give a pressure of 400 p.s.i.g. However, the pressure dropped rapidly for the first two minutes to about 35 p.s.i.g. and then to about 22 p.s.i.g. in 20 minutes.

The pressure during the carbon monoxide treating step can be from atmospheric up to several hundred pounds. The preferred range is from 100 to 500 p.s.i.g. total pressure.

After converting the hydrogenating metal component to the carbonyl and removing the carbonyl, the remaining catalyst before removal of the oily carbonaceous deposit therefrom is impregnated with an aqueous solution of salts of said hydrogenating metal component, preferably salts which are decomposable below 1100° F.

The concentration of the hydrogenating metal salt in the aqueous solution and the quantity of the latter used to impregnate the catalyst composition are such that the desired concentration of the hydrogenating metal component is established on the cracking support. To prepare an improved low fouling catalyst the amount of added hydrogenating metal salt, calculated on a metal basis, is at least 1% of the catalyst composition and may range upwards to 15 or 20% or more. Representative salts which may be employed to effect the impregnation of the catalyst composition are the chlorides, nitrates and acetates although other heat-decomposable salts may be employed as desired including various metallo-organic compositions such as the chelates.

After impregnation of the catalyst composition with the aqueous solution of hydrogenating metal salts, the treated catalyst is dried and heated to decompose the salts and to remove the carbonaceous deposits. The heat treatment is preferably conducted in an atmosphere such that the salts of the hydrogenating metal are converted to the oxide form. For this purpose, a dry combustion supporting gas such as a nitrogen-air mixture is used. Other oxygen-containing mixtures such as air plus carbon dioxide or other inert gas may be used. Preferably, at least during the initial portion of the burn, the catalyst temperature is controlled between 450 and 750° F., usually by employing a dilute oxygen-containing gas such as 1/4–1/2 percent oxygen in admixture with inert gas at the start of treatment. Such heat treatment in an oxidizing atmosphere is continued until burning substantially ceases and the salts have been substantially completely decomposed and converted to the oxides. Usually, a final burn with the oxygen concentration increased and the temperature of the dry combustion supporting gas increased up to 950° to 1000° F. is carried out until no further burning is observed. For in situ rejuvenation of hydrocracking catalyst, the temperature is kept below 1000° F. Though good results are obtained at near atmospheric pressure, to reduce the time required the oxidations are preferably carried out with an elevated pressure of above 200 p.s.i.g., such as above 500 p.s.i.g. up to 10,000 p.s.i.g. In any event, the temperature is kept below that at which there is an appreciable loss of the surface area of the catalyst.

The dry combustion supporting gas is preferably free of sulfur oxides and may be any suitable mixture of oxygen with an inert carrier gas. Examples are nitrogen-air flue gas air mixtures. Where the gas is recycled, it is preferred to remove combustion products such as $SO_2$ and $H_2O$ to prevent their build up in the circulating gas. For this purpose the gas may be scrubbed with a caustic solution or may be subjected to catalytic or adsorptive contacting.

By "dry" combustion supporting gas is meant that the molar concentration of water vapor is relatively low, that is, at least below about 6 mol percent and preferably below 1 mol percent.

Following the oxidation step, the catalyst may be variously treated prior to use or can be used directly in hydrogenative conversion operations. Such treatments can include thermactivation, reduction and sulfiding. Where the catalyst is to be placed in a hydrocracking operation, the catalyst is preferably sulfided, although it can be used without further treatment, particularly with sulfur-containing feeds which would sulfide the catalyst during start up to the desired sulfide state for the hydrogenating metal component such as nickel.

In a preferred embodiment of the present invention, particularly when treating a fixed bed of catalyst in situ in the hydrocracking reactor, the gaseous stream of unreacted carbon monoxide and metal carbonyl removed from the reactor is treated to regenerate the reacted carbon monoxide from the metal carbonyl and to form the impregnated solution of hydrogenating metal salt. This can be done by passing the gaseous stream through a hot zone at a temperature sufficient to decompose the carbonyl into carbon monoxide and the free metal. The latter can then be dropped or passed into an aqueous solution of nitric acid or like acid capable of forming the impregnating metal salt. After all the hydrogenating metal is collected and converted to the salt in the acid solution, the remaining acid is usually neutralized before using the solution for impregnating the catalyst. The stream of regenerated carbon monoxide and undecomposed metal carbonyl, if any, can be recycled to the reactor to form additional metal carbonyl with any remaining hydrogenating metal. This preferred technique of removing the hydrogenating metal as the carbonyl and impregnating the treated catalyst in situ, preferably with a metal salt solution generated external to the reactor from the removed carbonyl is superior to one of treating the deactivated catalyst with strong acid for hydrogenating metal redistribution since by the present invention catalyst can be rejuvenated in situ without introducing the acid into the reactor which presents a materials corrosion problem.

When the present process is applied to the preferred hydrocracking catalysts, particularly to such catalysts with nickel or cobalt hydrogenating metal components, the economic application of the hydrocracking is greatly expanded. Hence, the present process is especially desirable to use as the rejuvenation step in a hydrocracking process. Such hydrocracking process is carried out preferably as described in Scott U.S. Patent 2,944,006.

The activities of catalysts can be compared in terms of their ability to convert a feed stock to lower boiling products. By determining the relative conversion under the same operating conditions for fresh and treated catalysts the activity of a rejuvenated catalyst can be compared to that of fresh catalyst. One way to make such comparison is to carry out comparative hydrocracking tests with a selected standard and readily obtainable hydrocarbon feed stock. The fouling rate, i.e., the rate at which the temperature has to be raised to maintain the conversion constant is determined by operating at selected standard conditions to obtain a constant conversion by varying the temperature and continuing the run for an adequate period, usually for 250–350 hours. The starting temperatures, determined by extrapolating back to zero time after the unit has run for sufficient time to attain steady operation, usually after about 100 hours, serve as a basis for comparing the catalyst activities. The lower the starting temperature the longer the catalyst can be used at constant conversion before the temperature needs to be raised above the point where the selectivity and nature of the products changes substantially. Usually this temperature at which the run is terminated is about 700° F. when using the preferred catalysts and process of Scott Patent No. 2,944,006.

In determining the fouling rate, the standard feed test stock is passed through the test catalyst in a continuous feed pilot unit at a liquid hourly space velocity of 1.5, 1200 p.s.i., a once-through hydrogen rate of 6500 s.c.f. per barrel of feed and a constant conversion of 60% maintained by adjusting the temperature. The hydrogen consumption is about 900 s.c.f. of hydrogen per barrel.

The conversion activity is also conveniently measured with the same standard feed test stock by determining the change in gravity in ° API, between the feed and the product, which change is referred to as an "activity index." In this test, the conditions are maintained at 570° F. and 1200 p.s.i., a liquid hourly space velocity of feed passing through the catalyst of 2 and a once-through hydrogen rate of 12,000 s.c.f. per barrel of feed. The activity is determined from a product obtained after running the test for about 50 hours, which period screens out catalysts with shortlived activity. This test is conducted in a 6-tube continuous feed unit with a standard catalyst in one of the tubes for comparison purposes.

The standard feed stock employed in these tests for fouling rates and activity indices is a catalytic cycle oil obtained as a distillate fraction from a fluid type catalytic cracking unit, the fraction being one containing essentially equal proportions of aromatics and of paraffins plus naphthenes, which distillate is hydrofined to produce a stock having the following inspections:

| | |
|---|---:|
| Gravity, ° API | 29.2 |
| Aniline point, ° F. | 100.2 |
| Nitrogen (basic), p.p.m. | 0.3 |
| Aromatics, vol. percent | 47 |
| Naphthenes, vol. percent | 37 |
| Paraffins, vol. percent | 19 |
| ASTM distillation (D–158): | |
|     Start | 362 |
|     5% | 441 |
|     10% | 453 |
|     30% | 481 |
|     50% | 500 |
|     70% | 523 |
|     90% | 560 |
|     95% | 577 |
|     End point | 624 |

In the following more detailed description, the invention is described for illustrative purposes in terms of a hydrocracking catalyst composed of a nickel sulfide as the hydrogenating metal component disposed on a siliceous cracking support such as silica-alumina. The rejuvenation method of the present invention is employed following an extended on-stream period of at least 500 to 750 hours, usually over 1000 hours, up to several thousand hours, e.g., 4000 hours, under hydrocracking conditions. After such rejuvenation to an activity approaching its original activity, the catalyst is placed back in hydrocracking service for subsequent cycles of extended on-stream periods of at least 500 hours, generally over 750 hours and usually over 2500 hours and sometimes for 5000 hours, depending upon the fouling rates as exemplified hereinbelow.

To illustrate the process of the present invention, tests were carried out on catalysts which were prepared by the procedure of the following examples.

*Example 1*

A catalyst containing nickel sulfide on silica-alumina was prepared by impregnating silica-alumina particles with a solution of nickel nitrate in a concentration sufficient to provide the catalyst with 6 weight percent nickel on a dry basis. The silica-alumina particles employed contained about 90% silica and had a Cat. A value in excess of 40 before being impregnated with the hydrogenating metal component. After impregnation and drying, the catalyst was thermactivated by contact for 2.2 hours with a stream of hot air at an average temperature of about 1425° F. Thereafter, the catalyst was sulfided and used for hydrocracking in a four-bed reactor for several thousand hours on a hydrocarbon feed stock having a total nitrogen content of less than 1 p.p.m. The hydrocracking operation was discontinued when the temperature necessary to maintain hydrocracking conversion of the hydrocarbons at 60% had risen to approximately 750° F., indicating that the catalyst was spent. Samples of spent catalyst obtained from the various beds in the reactor were found to be coated with about 6% by weight of carbonaceous deposits calculated as carbon. Air blowing the spent catalysts by conventional procedures to remove the carbonaceous deposits produces catalysts having only about 20–40% of fresh catalyst activity. Particularly poor results are obtained with the catalysts from the first bed, where the hydrocarbon feed entered.

*Example 2*

A series of catalysts were tested in accordance with the "activity index" procedure described hereinabove. In this series, catalysts were prepared from spent catalysts as described in Example 1, Catalysts A and B being from the third bed and Catalysts C and D being from the first bed. These catalysts were subsequently treated as follows: Catalyst A was not treated with carbon monoxide but was impregnated with approximately 1.2 molar nickel nitrate solution at a ratio of 75 ml. of solution per 100 ml. of spent catalyst at room temperature for 4 hours. Thereafter the catalyst was dried at 250° F. for 20 hours and then heated in flowing nitrogen-air for about 24 hours at 1000° F. Catalyst B was the same as Catalyst A except that the catalyst was treated first with flowing hydrogen at 900° F. for three hours, then cooled to 200° F. while continuing the hydrogen flow and thereafter treated with flowing carbon monoxide at atmospheric temperature over a week-end (i.e., about 50–60 hours). Before the impregnation a sample of the carbon monoxide treated catalyst was analyzed polarographically for residual nickel. After impregnation the catalyst was dried at 250° F. for 14 hours and then heated in air for 4 hours at 1000° F. Catalyst C was taken from the first bed and was treated in the same manner as Catalyst B. Catalyst D was treated like Catalyst C except that the order of the heating in air and impregnation were reversed. The activities of the resulting catalysts after being sulfided were compared on the basis of activity index to a standard freshly prepared catalyst. The $C_4$ fraction of the resulting products were analyzed to determine the iso to normal paraffin ratios for comparison with the same ratio in the product obtained with freshly prepared catalyst, thereby obtaining an indication of the extent of similarity of the product and hence the nature of the reaction. Also measured was the increase in aniline points over the product obtained with fresh catalyst, which increase is a function of the increased hydrogen consumption due to aromatics saturation.

activity of fresh catalyst. It will be noted that as the residual hydrogenating metal is removed before the impregnation the hydrogenation consumption due to aromatics saturation becomes less; i.e., the aniline point increase for Catalyst B is about one half that obtained with Catalyst A. With substantially complete removal of the hydrogenating metal, i.e., below about 0.2 percent wt., the hydrogen consumption due to aromatics saturation would be about the same as for freshly prepared catalyst. Also, the catalysts were heated only to 1000° F., i.e., they were not thermactivated again. Hence, by the present process, catalysts can be rejuvenated in situ (i.e., 1000° F. being a reasonable temperature to use in a reactor) to an activity at least substantially equal to freshly prepared catalyst. Further, the isobutane-normal butane ratios of the products resulting from the use of these catalysts are similar to the 3.15 ratio obtained with fresh catalyst, which shows that the same desirable reaction is obtained for the rejuvenated catalyst.

*Example 3*

Another series of tests were run, in accordance with the procedure described hereinabove, to determine the fouling rates and starting temperatures for treated catalysts. In this series Catalyst E is a freshly prepared catalyst as described in Example 1. Catalyst F is a mixture of 80 parts by weight of Catalyst B and 60 parts by weight of Catalyst C which catalysts are described in Example 2. Catalyst G was prepared from spent catalyst from the first bed described in Example 1 by removing the carbonaceous deposits by the same heat treatment used in obtaining Catalysts A through D. The results from testing these Catalysts E through G after converting them to the sulfide form are given in the following table:

TABLE II

| Catalyst | Starting temperature (° F.) | Fouling rate (°F./hr.) |
| --- | --- | --- |
| E—Fresh catalyst | 570 | 0.12 |
| F—Treated catalyst | 588 | .10 |
| G—Air regeneration only | 630 | .25 |

The above results illustrate that spent catalysts rejuvenated and treated in accordance with the present procedure have excellent low fouling rates. Such low fouling rates are very important since a catalyst having one-half the fouling rate of a standard catalyst will have a useful life twice that of the life of a standard catalyst. In other words, the improved low fouling rate catalyst could be used for an on-stream period of 5000 hours as compared to 2500 hours for the standard catalyst before the temperature of operation reached the point where the catalyst needed to be rejuvenated.

TABLE I

| Catalyst | Residual nickel before impregnation (wt. percent) | Metal added by impregnation (wt. percent) | Catalyst activity (percent of standard) | Increase in aniline point | Iso/normal ratio |
| --- | --- | --- | --- | --- | --- |
| A (No CO treatment) | 6 | 5 | 111 | 11.5 | |
| B | 0.95 | 4.45 | 111 | 6 | 3.35 |
| C | 0.73 | 6.57 | 80 | 2 | 3.02 |
| D | 0.73 | 5.57 | 55 | | 2.03 |

The above results indicate that the process of the present invention gives a rejuvenated catalyst at least substantially equal to freshly prepared catalyst. For comparison, the spent catalyst used to prepare rejuvenated Catalysts A and B, when treated to remove carbonaceous deposits by the same heat treatment applied to Catalysts A through D, had an activity of no more than 25% of the The rejuvenation of the present invention greatly extends the catalyst life and hence contributes significantly to the economic value of the low temperature hydrocracking process. Further the process can be carried out in situ at reasonable temperatures and without incurring excessive corrosion of the usual structural material in reactors.

We claim:
1. In the process of rejuvenating a deactivated hydrogenative conversion catalyst composed of at least one hydrogenating metal component selected from the iron transitional group composited with a high surface area active cracking support and deactivated by long exposure to hydrogenative conversion conditions and having carbonaceous deposits accumulated thereon, by impregnating said deactivated catalyst before removal of said carbonaceous deposits with a salt of a hydrogenating metal selected from the iron transitional group in an amount sufficient to give the resulting catalyst a hydrogenating metal content of at least one percent calculated on a metal basis and thereafter drying said impregnated catalyst, decomposing said metal salts and removing said carbonaceous deposits by heating in an oxygen-containing gas, the improvement of reducing the hydrogen consumption tendency of the rejuvenated catalyst which comprises the steps of subjecting said deactivated catalyst to an atmosphere of carbon monoxide under conditions forming normally gaseous carbonyl compounds of said hydrogenating metal component, including a temperature below about 400° F. and a total pressure between about 100 to 500 p.s.i.g., and separating said metal carbonyl compounds from the treated catalyst support, said steps being carried out before the treated catalyst is impregnated with said hydrogenating metal slat and the carbonaceous deposits are removed from the catalyst.

2. A method of rejuvenating deactivated hydrocracking catalyst having carbonaceous deposits thereon and composed of at least $\frac{1}{16}$ inch average diameter granules of an active cracking support composited with a hydrogenating metal component selected from the iron transitional group which below 400° F. reacts with carbon monoxide to form normally gaseous metal carbonyl compounds which method reduces the hydrogen consumption tendency of the rejuvenated hydrocracking catalyst, which process comprises the steps of:
(1) subjecting said deactivated catalyst before removal of said carbonaceous deposits to an atmosphere of carbon monoxide under conditions forming normally gaseous carbonyl compounds of said hydrogenating metal component, including a temperature below about 400° F. and a total pressure between about 100 to 500 p.s.i.g.,
(2) separating said metal carbonyl compounds from the treated catalyst support,
(3) impregnating said treated catalyst support with a solution of a salt of a hydrogenating iron transition group metal, in an amount sufficient to give the resulting catalyst a hydrogenating metal content of at least one percent on a metal basis, and
(4) thereafter decomposing said metal salts and removing said carbonaceous deposits by heating in an oxygen-containing gas.

3. The process of claim 2 wherein said separated metal carbonyl compounds are converted to a solution of a hydrogenating metal salt and said solution is used at least in part to impregnate said treated catalyst support.

4. A method of rejuvenating a deactivated hydrogenative conversion catalyst composited with an acid reactive support without removing the catalyst from the hydrogenative conversion reactor and while minimizing corrosive attack on said reactor and acid attack on said support, said deactivated catalyst having carbonaceous deposits thereon and a hydrogenating metal component selected from the iron transitional group which reacts with carbon monoxide to form normally gaseous carbonyl compounds which method reduces the hydrogen consumption tendency of the rejuvenated hydrogenative conversion catalyst, which comprises the steps of:
(1) introducing carbon monoxide into the reactor and into contact with said deactivated catalyst before removal of said carbonaceous deposits under conditions forming normally gaseous carbonyl compounds of said hydrogenating metal component, including a temperature below about 400° F. and total pressure between about 100 to 500 p.s.i.g.,
(2) separating said metal carbonyl compounds from the treated catalyst support and removing said carbonyl compounds from the reactor,
(3) impregnating said treated catalyst support in situ with a solution of a salt of a hydrogenating metal selected from the iron transition group, in an amount sufficient to give the resulting catalyst a hydrogenating metal content of at least one percent by weight calculated as metal, and
(4) thereafter decomposing said metal salts and removing said carbonaceous deposits by heating in an oxygen-containing gas.

5. The process of claim 4 wherein the deactivated catalyst is first treated with a stream of hydrogen to convert the hydrogenating metal component to the metal state.

6. The process of claim 4 wherein said separated gaseous metal carbonyl compounds are converted to carbon monoxide and a solution of a hydrogenating metal salt, at least part of said carbon monoxide is recycled and said metal salt solution is used at least in part to impregnate said treated catalyst support.

7. The process of claim 1 wherein said hydrogenating metal component is nickel and said salt of a hydrogenating metal is a nickel salt.

References Cited by the Examiner

UNITED STATES PATENTS

| | | | |
|---|---|---|---|
| 2,276,921 | 3/1942 | Brown | 252—411 X |
| 2,330,174 | 9/1943 | Hachmuth | 252—412 X |
| 3,151,088 | 9/1964 | Sanford et al. | 252—412 X |
| 3,220,957 | 11/1965 | Hoff et al. | 252—414 |

MILTON WEISSMAN, *Primary Examiner.*

BENJAMIN HENKIN, OSCAR R. VERTIZ,
*Examiners.*

H. S. MILLER, A. J. GREIF, *Assistant Examiners.*